(12) United States Patent
Sun et al.

(10) Patent No.: US 9,802,388 B2
(45) Date of Patent: *Oct. 31, 2017

(54) ALUMINUM ALLOY RESIN COMPOSITE AND METHOD OF PREPARING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Jian Sun, Guangdong (CN); Yanqin Wu, Guangdong (CN); Qiang Guo, Guangdong (CN); Liang Chen, Guangdong (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 253 days.

This patent is subject to a terminal disclaimer.

(21) Appl. No.: 14/466,937

(22) Filed: Aug. 22, 2014

(65) Prior Publication Data
US 2014/0363659 A1    Dec. 11, 2014

Related U.S. Application Data

(63) Continuation of application No. PCT/CN2013/071797, filed on Feb. 22, 2013.

(30) Foreign Application Priority Data

Feb. 24, 2012    (CN) .......................... 2012 1 0043636

(51) Int. Cl.
*B32B 15/088* (2006.01)
*B32B 15/08* (2006.01)
(Continued)

(52) U.S. Cl.
CPC ...... *B32B 15/088* (2013.01); *B29C 45/14311* (2013.01); *B29C 45/14778* (2013.01);
(Continued)

(58) Field of Classification Search
None
See application file for complete search history.

(56) References Cited

U.S. PATENT DOCUMENTS

| 4,154,705 A | 5/1979 | Baldi |
| 4,499,237 A | 2/1985 | Tracke |
| (Continued) | | |

FOREIGN PATENT DOCUMENTS

| CN | 1190062 A | 8/1998 |
| CN | 1492804 A | 4/2004 |
| (Continued) | | |

OTHER PUBLICATIONS

Extended European Search Report dated Sep. 25, 2015, issued in related European Patent Application No. EP 12869418.9 (7 pages).
(Continued)

*Primary Examiner* — Shamim Ahmed

(57) ABSTRACT

A method of preparing an aluminum alloy resin composite comprises: providing an aluminum alloy substrate having an oxide layer on a surface thereof, wherein the oxide layer has one or more nanopores; forming one or more corrosion pores on an outer surface of the oxide layer by using a corrosion agent, wherein the corrosion agent is at least one selected from a group of ammonia, ammonium salt, hydrazine, hydrazine derivative, and water-soluble amine compound; and injection molding a resin composition to the surface of the aluminum alloy substrate.

18 Claims, 2 Drawing Sheets

(51) Int. Cl.
| | | |
|---|---|---|
| *B29C 45/14* | (2006.01) | |
| *C25D 11/08* | (2006.01) | |
| *C25D 11/16* | (2006.01) | |
| *C25D 11/24* | (2006.01) | |
| *B32B 15/085* | (2006.01) | |
| *B32B 27/28* | (2006.01) | |
| *B29K 705/02* | (2006.01) | |

(52) U.S. Cl.
CPC ............ *B32B 15/08* (2013.01); *B32B 15/085* (2013.01); *B32B 27/286* (2013.01); *C25D 11/08* (2013.01); *C25D 11/16* (2013.01); *C25D 11/24* (2013.01); *C25D 11/246* (2013.01); *B29K 2705/02* (2013.01); *B32B 2270/00* (2013.01); *B32B 2509/00* (2013.01); *B32B 2605/08* (2013.01); *Y10T 428/249956* (2015.04)

(56) References Cited

U.S. PATENT DOCUMENTS

| | | | |
|---|---|---|---|
| 4,687,551 A | 8/1987 | Furneaux et al. | |
| 5,021,504 A | 6/1991 | Fujita | |
| 5,332,780 A | 7/1994 | Kitazawa et al. | |
| 5,602,200 A | 2/1997 | Wissmann | |
| 5,951,747 A | 9/1999 | Lewis | |
| 6,495,225 B1 | 12/2002 | Nakajima et al. | |
| 6,804,081 B2 | 10/2004 | Den et al. | |
| 7,841,577 B2 | 11/2010 | Yamaguchi et al. | |
| 7,879,734 B2 | 2/2011 | Fukutani et al. | |
| 8,703,272 B2 * | 4/2014 | Naritomi | B29C 45/14311 264/264 |
| 2001/0036559 A1 | 11/2001 | Ulrich et al. | |
| 2002/0033108 A1 | 3/2002 | Kkiyama et al. | |
| 2002/0040888 A1 | 4/2002 | Marczak et al. | |
| 2003/0001274 A1 | 1/2003 | Den et al. | |
| 2003/0180555 A1 | 9/2003 | Wakayama et al. | |
| 2004/0013931 A1 | 1/2004 | Takamura et al. | |
| 2004/0062943 A1 | 4/2004 | Naritomi et al. | |
| 2004/0142503 A1 | 7/2004 | Lee et al. | |
| 2004/0229031 A1 | 11/2004 | Gell et al. | |
| 2006/0046602 A1 | 3/2006 | Kang | |
| 2006/0054589 A1 | 3/2006 | Omori et al. | |
| 2006/0055084 A1 | 3/2006 | Yamaguchi et al. | |
| 2006/0057492 A1 | 3/2006 | Kunita | |
| 2006/0088680 A1 | 4/2006 | Kitahara | |
| 2006/0127684 A1 | 6/2006 | Naritomi et al. | |
| 2006/0257624 A1 | 11/2006 | Naritomi et al. | |
| 2007/0096359 A1 | 5/2007 | Torfs | |
| 2007/0116934 A1 * | 5/2007 | Miller | C25D 1/10 428/172 |
| 2007/0196637 A1 | 8/2007 | Good et al. | |
| 2008/0041257 A1 | 2/2008 | Teng | |
| 2008/0057336 A1 | 3/2008 | Kurokawa et al. | |
| 2008/0070152 A1 | 3/2008 | Yu | |
| 2008/0081867 A1 | 4/2008 | Sakata et al. | |
| 2008/0102404 A1 | 5/2008 | Tashiro et al. | |
| 2009/0017242 A1 | 1/2009 | Weber et al. | |
| 2009/0075156 A1 | 3/2009 | Long et al. | |
| 2009/0155522 A1 | 6/2009 | Raghavendran | |
| 2009/0202840 A1 | 8/2009 | Griebel et al. | |
| 2009/0274889 A1 | 11/2009 | Iwahashi et al. | |
| 2009/0280296 A1 | 11/2009 | Naritomi et al. | |
| 2009/0304970 A1 * | 12/2009 | Imaizumi | B29C 45/062 428/38 |
| 2010/0018025 A1 | 1/2010 | Naritomi et al. | |
| 2010/0021718 A1 * | 1/2010 | Vos | B32B 5/26 428/315.9 |
| 2010/0028602 A1 | 2/2010 | Naritomi et al. | |
| 2010/0177392 A1 | 7/2010 | Masuda et al. | |
| 2010/0189958 A1 | 7/2010 | Naritomi et al. | |
| 2010/0190029 A1 | 7/2010 | Ueki | |
| 2010/0215965 A1 | 8/2010 | Tadaki | |
| 2010/0218827 A1 | 9/2010 | Aono et al. | |
| 2010/0255732 A1 * | 10/2010 | Kohmura | B29C 45/14311 439/733.1 |
| 2010/0283165 A1 | 11/2010 | Ihara | |
| 2010/0304083 A1 | 12/2010 | Naritomi et al. | |
| 2010/0316878 A1 | 12/2010 | Naritomi et al. | |
| 2010/0319757 A1 | 12/2010 | Oetting | |
| 2011/0008644 A1 | 1/2011 | Naritomi et al. | |
| 2011/0111214 A1 | 5/2011 | Endo et al. | |
| 2011/0165342 A1 | 7/2011 | Imai et al. | |
| 2011/0250377 A1 | 10/2011 | Qin | |
| 2011/0281135 A1 * | 11/2011 | Gong | B01J 23/80 428/626 |
| 2011/0297549 A1 | 12/2011 | Chen et al. | |
| 2011/0300400 A1 | 12/2011 | Tomita et al. | |
| 2011/0305893 A1 | 12/2011 | Chang et al. | |
| 2011/0318585 A1 | 12/2011 | Su et al. | |
| 2012/0015186 A1 * | 1/2012 | Honma | B29C 45/0001 428/375 |
| 2012/0039066 A1 | 2/2012 | Hatanaka et al. | |
| 2012/0043689 A1 | 2/2012 | Chang et al. | |
| 2012/0094108 A1 | 4/2012 | Chang et al. | |
| 2012/0168990 A1 * | 7/2012 | Kuwahara | B29C 33/08 264/404 |
| 2012/0213971 A1 | 8/2012 | Ihara | |
| 2012/0237755 A1 | 9/2012 | Chang et al. | |
| 2013/0043689 A1 | 2/2013 | Tai et al. | |
| 2013/0052582 A1 | 2/2013 | Hayashi | |
| 2013/0078423 A1 | 3/2013 | Sutou et al. | |
| 2013/0242487 A1 * | 9/2013 | Fujioka | B29C 45/14221 361/679.01 |
| 2014/0360974 A1 | 12/2014 | Sun et al. | |
| 2014/0363623 A1 | 12/2014 | Sun et al. | |
| 2014/0363631 A1 | 12/2014 | Gong et al. | |
| 2014/0363657 A1 | 12/2014 | Gong et al. | |
| 2014/0363658 A1 | 12/2014 | Sun et al. | |
| 2014/0363660 A1 | 12/2014 | Gong et al. | |
| 2014/0363686 A1 | 12/2014 | Sun et al. | |

FOREIGN PATENT DOCUMENTS

| | | |
|---|---|---|
| CN | 1639387 A | 7/2005 |
| CN | 1706992 A | 12/2005 |
| CN | 1711170 A | 12/2005 |
| CN | 1717323 A | 1/2006 |
| CN | 101010452 A | 8/2007 |
| CN | 101248219 A | 8/2008 |
| CN | 101313087 A | 11/2008 |
| CN | 101341023 A | 1/2009 |
| CN | 101396888 A | 4/2009 |
| CN | 101409229 A | 4/2009 |
| CN | 101547779 A | 9/2009 |
| CN | 101568420 A | 10/2009 |
| CN | 101578170 A | 11/2009 |
| CN | 101607446 A | 12/2009 |
| CN | 101623933 A | 1/2010 |
| CN | 101640169 A | 2/2010 |
| CN | 101687390 A | 3/2010 |
| CN | 101743111 A | 6/2010 |
| CN | 101795845 A | 8/2010 |
| CN | 101802263 A | 8/2010 |
| CN | 101875251 A | 11/2010 |
| CN | 101913065 A | 12/2010 |
| CN | 101917935 A | 1/2011 |
| CN | 101941271 A | 1/2011 |
| CN | 101988609 A | 3/2011 |
| CN | 102021569 A | 4/2011 |
| CN | 102039700 A | 5/2011 |
| CN | 102056724 A | 5/2011 |
| CN | 102229266 A | 11/2011 |
| CN | 102234803 A | 11/2011 |
| CN | 102268183 A | 12/2011 |
| CN | 102345127 A | 2/2012 |
| CN | 102371679 A | 3/2012 |
| CN | 102441962 A | 5/2012 |
| CN | 102442028 A | 5/2012 |
| CN | 102666921 A | 9/2012 |
| CN | 102776466 A | 11/2012 |
| CN | 103036086 A | 4/2013 |

(56) References Cited

FOREIGN PATENT DOCUMENTS

| | | |
|---|---|---|
| EP | 1643546 A2 | 4/2006 |
| EP | 1958763 A1 | 8/2008 |
| EP | 2031099 A1 | 3/2009 |
| EP | 2154203 A1 | 2/2010 |
| EP | 2221398 A1 | 8/2010 |
| EP | 2426237 A1 | 3/2012 |
| JP | S50-39759 A | 4/1975 |
| JP | S59211576 A | 11/1984 |
| JP | 61-106796 A | 5/1986 |
| JP | H106272085 A | 9/1994 |
| JP | 2000144491 A | 5/2000 |
| JP | 2001254009 A | 9/2001 |
| JP | 2001315159 A | 11/2001 |
| JP | 2002225164 A | 8/2002 |
| JP | 2004-055248 A | 2/2004 |
| JP | 2004249681 A | 9/2004 |
| JP | 2005-342895 A | 12/2005 |
| JP | 2006-001216 A | 1/2006 |
| JP | 2006027018 A | 2/2006 |
| JP | 2007-016123 | 1/2007 |
| JP | 2007050630 A | 3/2007 |
| JP | 2007203585 A | 8/2007 |
| JP | 2008091933 A | 4/2008 |
| JP | 2008095132 A | 4/2008 |
| JP | 2006124827 A | 5/2008 |
| JP | 2008138288 A | 6/2008 |
| JP | 2008156381 A | 7/2008 |
| JP | 2008-243412 A | 10/2008 |
| JP | 2009041008 A | 2/2009 |
| JP | 2009267334 A | 11/2009 |
| JP | 2010-000679 A | 1/2010 |
| JP | 2010030177 A | 2/2010 |
| JP | 2010-064496 A | 3/2010 |
| JP | 2010110931 | 5/2010 |
| JP | 2011021260 A | 2/2011 |
| JP | 2011168017 A | 9/2011 |
| JP | 2011174133 A | 9/2011 |
| JP | 2011-194594 A | 10/2011 |
| JP | 2011218603 A | 11/2011 |
| JP | 2012006392 A | 1/2012 |
| JP | 2012193448 A | 10/2012 |
| KR | 20060104540 A | 10/2006 |
| KR | 20080062814 A | 7/2008 |
| KR | 20090027317 A | 3/2009 |
| KR | 20090089852 A | 8/2009 |
| WO | WO 01/38444 A1 | 5/2001 |
| WO | WO 2004/048087 A1 | 6/2004 |
| WO | 2005109984 A2 | 11/2005 |
| WO | 2007066742 A1 | 6/2007 |
| WO | WO 2009/078377 A1 | 6/2009 |
| WO | WO 2010/073636 A1 | 7/2010 |
| WO | WO 2011/055757 A1 | 5/2011 |
| WO | WO 2011/071102 A1 | 6/2011 |
| WO | WO 2011/123790 A1 | 10/2011 |
| WO | WO 2013/123754 A1 | 8/2013 |
| WO | WO 2013/123756 A1 | 8/2013 |
| WO | WO 2013/123769 A1 | 8/2013 |
| WO | WO 2013/123770 A1 | 8/2013 |
| WO | WO 2013/123771 A1 | 8/2013 |
| WO | WO 2013/123772 A1 | 8/2013 |
| WO | WO 2013/123773 A1 | 8/2013 |
| WO | WO 2013/123898 A1 | 8/2013 |
| WO | 2013148476 A1 | 10/2013 |
| WO | 2013178057 A1 | 12/2013 |
| WO | 2014101778 A1 | 7/2014 |

OTHER PUBLICATIONS

Extended European Search Report dated Sep. 25, 2015, issued in related European Patent Application No. EP12869214.2 (6 pages).
PCT International Preliminary Report on Patentability dated Aug. 26, 2014, issued in related International Applicatio No. PCT/CN2012/078830 (5 pages).
PCT International Preliminary Report on Patentability dated Aug. 26, 2014, issued in related International Applicatio No. PCT/CN2012/078832 (5 pages).
PCT International Preliminary Report on Patentability dated Aug. 26, 2014, issued in related International Application No. PCT/CN2012/082025 (5 pages).
PCT International Preliminary Report on Patentability dated Aug. 26, 2014, issued in related International Application No. PCT/CN2012/082029 (5 pages).
PCT International Preliminary Report on Patentability dated Aug. 26, 2014, issued in related International Application No. PCT/CN2012/082043 (5 pages).
PCT International Preliminary Report on Patentability dated Aug. 26, 2014. issued in related International Application No. PCT/CN2012/082031 (5 pages).
PCT International Search Report and Written Opinion dated Mar. 27, 2014, issued in related International Application No. PCT/CN2013/090471 (13 pages).
PCT International Search Report and Written Opinion dated Sep. 5, 2013, issued in related International Applic.ation No. PCT/CN2013/076351 (12 pages).
Non-Final Office Action dated May 24, 2016, issued in related U.S. Appl. No. 14/466,906 (11 pages).
Non-Final Office Action dated Feb. 18, 2016, issued in related U.S. Appl. No. 14/466,927 (15 pages).
Non-Final Office Action dated Apr. 8, 2016, issued in related U.S. Appl. No. 14/466,932 (9 pages).
Final Office Action dated Jun. 20, 2016, issued in related U.S. Appl. No. 14/466,932 (10 pages).
PCT International Search Report dated Nov. 29, 2012, issued in International Application No. PCT/CN2012/078830 (4 pages).
PCT International Search Report dated Dec. 13, 2012, issued in International Application No. PCT/CN2012/078832 (4 pages).
PCT International Search Report dated Jan. 3, 2013, issued in International Application No. PCT/CN2012/082025 (4 pages).
PCT International Search Report dated Jan. 3, 2013, issued in International Application No. PCT/CN2012/082029 (4 pages).
PCT International Search Report dated Jan. 3, 2013, issued in International Application No. PCT/CN2012/082031 (4 pages).
PCT International Search Report dated Jan. 3, 2013, issued in International Application No. PCT/CN2012/082036 (4 pages).
PCT International Search Report dated Jan. 10, 2013, issued in International Application No. PCT/CN2012/082043 (4 pages).
PCT International Search Report dated May 30, 2013, issued in International Application No. PCT/CN2013/071797 (4 pages).
Database CA [Online] Chemical Abstracts Service. Jan. 26, 2006, Taisei Plas Co., Ltd., Japan: Composite materials of anodized aluminum alloys and thermoplastic resins, and their manufacture by injection molding, and Abstract for JP 2006-001216, Jan. 5, 2006 (3 pages).
Furneaux et al., "The formation of controlled-porosity membranes from anodically oxidized aluminum", *Nature*, vol. 337, No. 6203, Jan. 12, 1989, pp. 147-149.
Gong et al., "Electrochemical/chemical synthesis of nanostructured arrays of oxide cones or rings", *Journal of Materials Chemistry*, vol. 18, No. 15, Mar. 12, 2008, pp. 1741-1746.
Lee et al., "Nanostructure-Dependent Water-Droplet Adhesiveness Change in Superhydrophobic Anodic Aluminum Oxide Surfaces: From Highly Adhesive to Self-Cleanable", *Langmuir Letter*, vol. 26, No. 3, Feb. 2, 2010, pp. 1412-1415, including Supporting Information, Dec. 29, 2009.
PCT International Preliminary Report on Patentability dated Aug. 26, 2014, issued in related International Application No. PCT/CN2013/071797 (7 pages).
Non-Final Office Action dated Aug. 17, 2016, issued in related U.S. Appl. No. 14/466,873 (15 pages).
Non-Final Office Action dated Aug. 1, 2016, issued in related U.S. Appl. No. 14/466,920 (12 pages).
Non-Final Office Action dated Sep. 20, 2016, issued in related U.S. Appl. No. 14/466,932 (17 pages).
Non-Final Office Action for U.S. Appl. No. 14/466,853, dated Sep. 30, 2016, (12 pages).
Non-Final Office Action for U.S. Appl. No. 14/466,363, dated Oct. 18, 2016 (12 pages).

(56) References Cited

OTHER PUBLICATIONS

Final Office Action for U.S. Appl. No. 14/466,906, dated Nov. 9, 2016, 36 pages.
Final Office Action for U.S. Appl. No. 14/466,932, dated Jan. 20, 2017, 15 pages.
Non-Final Office Action for U.S. Appl. No. 14/554,370, dated Feb. 2, 2017, 46 pages.
Final Office Action for U.S. Appl. No. 14/466,920, dated Feb. 16, 2017, 18 pages.
Final Office Action for U.S. Appl. No. 14/466,873, dated Feb. 16, 2017, 19 pages.
Non-Final Office Action for U.S. Appl. No. 14/466,927, dated Feb. 21, 2017, 37 pages.
Final Office Action for U.S. Appl. No. 14/466,853, dated Mar. 13, 2017, 18 pages.
Final Office Action for U.S. Appl. No. 14/466,363, dated Mar. 29, 2017, 18 pages.
Non-Final Office Action for U.S. Appl. No. 14/466,932, dated Apr. 28, 2017, 25 pages.
Non-Final Office Action for U.S. Appl. No. 14/723,344, dated Jun. 8, 2017, 44 pages.

* cited by examiner

US 9,802,388 B2

ALUMINUM ALLOY RESIN COMPOSITE AND METHOD OF PREPARING THE SAME

CROSS-REFERENCE TO RELATED APPLICATION

This application is a continuation of International Patent Application No. PCT/CN2013/071797, filed Feb. 22, 2013, which claims priority to and benefits of Chinese Patent Application Serial No. 201210043636.5, filed with the State Intellectual Property Office of P. R. China on Feb. 24, 2012. The entire content of the above applications is hereby incorporated by reference.

FIELD

The present invention relates to metal-plastic composites and method of preparing the same, and, more particularly, to an aluminum alloy-resin composite, and a method of preparing the same.

BACKGROUND

In manufacturing articles, such as automobiles, household appliances and industrial machines, a metal and a resin often need to be firmly bonded together. In conventional methods, an adhesive may be used at normal temperature or under heating to integrally bond a metal and a synthetic resin. Alternatively, a resin may be bonded to a magnesium alloy, an aluminum alloy, or ferroalloys such as stainless steel directly without an adhesive.

Nano molding technology (NMT) is a technique of integrally bonding a metal and a resin, and allows the resin to be directly injection molded on a surface of a metal sheet by nano molding the surface of the metal sheet so as to obtain a metal-resin integrally molded product. For effective bonding of a metal and a resin, NMT may replace commonly used insert molding or zinc-aluminum or magnesium-aluminum die casting so as to provide a metal-resin integrally molded product with low cost and high performance. Compared with other bonding technologies, NMT may reduce the weight of the final product, may ensure excellent strength of the mechanical structure, high processing rate, high output, and allows more appearance decoration methods, consequently applicable to vehicles, IT equipment, and 3C products.

SUMMARY

Embodiments of the present disclosure seek to solve at least one of the problems existing in the prior art, and, particularly, the technical problems of weak bonding force between the aluminum alloy and resin in an aluminum alloy-resin composite. And the present disclosure aims to provide a method of preparing an aluminum alloy resin composite with strong combination force between the aluminum alloy and resin, thereby easing and simplifying mass production.

According to a first aspect of the present disclosure, there is provided a method of preparing an aluminum alloy resin composite. In some embodiments of the present disclosure, the method comprises: providing an aluminum alloy substrate having an oxide layer on a surface thereof, wherein the oxide layer has a nanopore; forming a corrosion pore on an outer surface of the oxide layer by using a corrosion agent, wherein the corrosion agent is at least one selected from a group of ammonia ($NH_3$), ammonium salt, hydrazine ($N_2H_4$), hydrazine derivative, and water-soluble amine compound; and injection molding a resin composition to the surface of the aluminum alloy substrate having the nanopore and the corrosion pore.

According to another aspect of the present disclosure, there is provided an aluminum alloy resin composite obtained by any of the method disclosed herein.

According to an embodiment, a unique two-layer spatial pore structure may be formed on the surface of aluminum alloy. By means of the method according to embodiments of the present disclosure, an aluminum oxide layer may be formed on the surface of the aluminum alloy. The aluminum oxide layer has nanopore(s). By means of the technical solutions according to embodiments of the present disclosure, one or more nanopores having an average diameter of about 10 nm to about 100 nm may be formed in the aluminum oxide layer.

By means of further corrosion, corrosion pore(s) may be formed on the outer surface of the aluminum oxide layer, to be contacted with the resin. The corrosion pore may have a larger average diameter than the nanopores. By means of the technical solutions according to embodiments of the present disclosure, one or more corrosion pores having an average diameter of about 200 nm to about 2000 nm may be formed on the outer surface of the aluminum oxide layer, which enhance the bonding between the resin and the aluminum alloy.

In the following molding step, the resin may penetrate into the pores (for example, the nanopores) in the inner layer through the relative larger pores (for example, the corrosion pores) on the outer surface of the aluminum alloy. The molding is thus made easier. Meanwhile, the resin may be bonded with the aluminum alloy by a chemical reaction between the corrosion agent and effective compositions in the resin, in order to form a better and stronger combination between the resin and the aluminum alloy.

Compared with conventional methods, the method disclosed herein does not significantly alter the size of the metal substrate (for example, the aluminum alloy) and the appearance of the aluminum alloy, and produces relatively less heat during the processing steps. Moreover, the resin may be easily injection molded into the corrosion pores having a larger average diameter than the nanopores. There is no particular requirement on the resin used. Then the present technical solution may provide a wide range of applications, is environment-friendly, and may be adopted for mass production.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions made with reference the accompanying drawings, in which.

DETAILED DESCRIPTION

Figure 1:
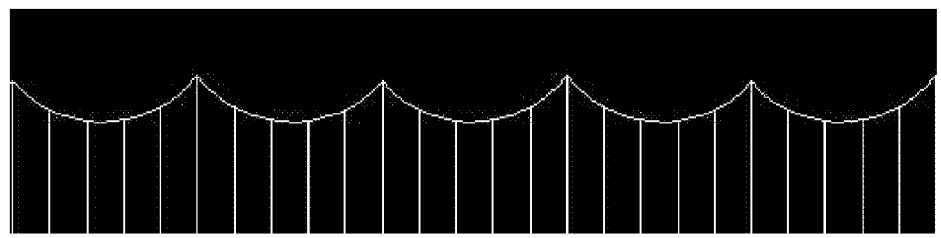
FIG. 1 is a two-layer spatial pore structure in the oxide layer of an aluminum alloy, according to an embodiment of the present disclosure.

Reference will be made in detail to embodiments of the present disclosure. The embodiments described herein are explanatory, illustrative, and used to generally understand the present disclosure. The embodiments shall not be construed to limit the present disclosure.

According to a first aspect of the present disclosure, there is provided a method of preparing an aluminum alloy resin composite. In some embodiments of the present disclosure, the method may comprise: providing an aluminum alloy substrate having an oxide layer on a surface thereof, wherein the oxide layer has one or more nanopores; forming one or more corrosion pores on an outer surface of the oxide layer by using a corrosion agent, wherein the corrosion agent is at least one selected from a group of ammonia ($NH_3$), ammonium salt, hydrazine ($N_2H_4$), hydrazine derivative, and water-soluble amine compound; and injection molding a resin composition to the surface of the aluminum alloy substrate having the nanopores and the corrosion pores.

According to an embodiment, a unique two-layer spatial pore structure may be formed on the surface of aluminum alloy. According to embodiments of the present disclosure, an aluminum oxide layer may be formed on the surface of the aluminum alloy. The aluminum oxide layer has the nanopore(s). The corrosion pore(s) may be formed on the outer surface of the aluminum oxide layer, to be contacted with the resin. The corrosion pores may have a larger average diameter than the nanopores. The structures of the pores enhance the bonding between the resin and the aluminum alloy.

In the following molding step, the resin may penetrate into the pores (for example, the nanopores) in the inner layer through the relative larger pores (for example, the corrosion pores) on the outer surface of aluminum alloy. Accordingly, the molding was made easier. Meanwhile, the resin may be bonded with the aluminum alloy by a chemical reaction between the corrosion agent and effective compositions in the resin, in order to form a better and stronger combination between the resin and the aluminum alloy. Then the present technical solution may provide a wide range of applications, is environment-friendly, and may be adopted for mass production.

In an embodiment of the present disclosure, the method of preparing the aluminum alloy resin composite may comprise: S1) anodizing a surface of an aluminum alloy substrate to form an oxide layer having one or more nanopores. In some embodiments of the present disclosure, the oxide layer may be formed by means of an anodic oxidation.

The method of anodic oxidation may be known to those skilled in the art. According to an embodiment of present disclosure, the anodic oxidation may be carried out under the following conditions: the aluminum alloy substrate is electrolyzed in a sulphuric acid having a concentration of about 10 wt % to about 30 wt % at a temperature of about 10 degrees Celsius to about 30 degrees Celsius under a voltage of about 10 V to about 100 V for about 1 minute to about 40 minutes to form the oxide layer having a thickness of about 1 micron to about 10 microns on a surface of the aluminum alloy.

In some embodiments of the present disclosure, any apparatus known for anodic oxidation, for example, an anodization tank may be applied. According to embodiments of the present disclosure, the oxide layer formed by means of anodic oxidation may have a thickness of about 1 micron to about 10 microns. Alternatively, the oxide layer formed by means of anodic oxidation may have a thickness of about 1 micron to about 5 microns.

In some embodiments of the present disclosure, the nanopores in the oxide layer may have an average diameter of about 10 nm to about 100 nm. In some embodiments of the present disclosure, the nanopores in the oxide layer may have an average diameter of about 20 nm to about 80 nm. In some embodiments of the present disclosure, the nanopores in the oxide layer may have an average diameter of about 20 nm to about 60 nm. In some embodiments of the present disclosure, the nanopores may have a depth of about 0.5 microns to about 9.5 microns. In some embodiments of the present disclosure, the nanopores may have a depth about 0.5 microns to about 5 microns. The nanopores may provide stronger bonding force between the oxide layer and the resin compared with conventional metal-resin composites.

In an embodiment of the present disclosure, the method of preparing the aluminum alloy resin composite may comprise: S2) contacting the resulting aluminum alloy substrate obtained from step S1) with a corrosion agent, to form one or more corrosion pores in an outer surface of the oxide layer. The corrosion agent is at least one selected from a group of ammonia, ammonium salt, hydrazine, hydrazine derivative, and water-soluble amine compound.

There is no particular limit to the corrosion agent used to produce the corrosion pores. In an embodiment, the aluminum alloy substrate may be contacted with a gaseous corrosion agent in order to be corroded. The corrosion agent may be gaseous at normal temperature. Alternatively, solid or liquid corrosion agent at normal temperature may be transformed to the gaseous corrosion agent so as to perform the corrosion in the present embodiment.

In an alternative embodiment, the aluminum alloy substrate may be contacted with liquid corrosion agent. In an embodiment, the corrosion pore is formed by immersing the aluminum alloy substrate with the nanopore in a corrosion solution comprising the corrosion agent. The corrosion solution has a pH of about 10 to about 13. In some embodiments, the corrosion solution may be an aqueous solution comprising at least one selected from a group of ammonia, ammonium salt, hydrazine, hydrazine derivative, and water-soluble amine compound, without special limit.

In some embodiments of the present disclosure, the hydrazine may be at least one selected from a group of: hydrazine hydrate, hydrazine acetate, and hydrazine carbonate. In some embodiments of the present disclosure, the hydrazine derivative may be methyl-substituted derivatives, for example, the hydrazine derivative may be methyl hydrazine and/or 1,1-dimethyl hydrazine. In some embodiments of the present disclosure, the water-soluble amine compound may be at least one selected from a group of: ethylene diamine, methylamine, dimethylamine, ethylamine, diethylamine, and ethanolamine.

In some embodiments of the present disclosure, the concentration of the corrosion solution may be any concentration desired. The corrosion solution can be a commercially available corrosion solution having a desired concentration. The corrosion solution can be prepared or diluted to obtain the desired concentration.

In some embodiments of the present disclosure, the corrosion pores formed by the corrosion solution may have a nanoscale average diameter. In some embodiments of present disclosure, the corrosion pores may have an average diameter of about 200 nm to about 2000 nm. In some embodiments of present disclosure, the corrosion pores may have an average diameter of about 200 nm to about 1000 nm. In some embodiments of present disclosure, the corrosion pores may have an average diameter of about 400 nm to about 1000 nm. In some embodiments of present disclosure, the corrosion pores may have a depth of about 0.5 micron to about 9.5 microns. In some embodiments of present disclosure, the corrosion pores may have a depth of about 0.5 micron to about 5 microns. The corrosion pores allow the resin composition to be injected into the surface pore (for example, the nanopores) more easily, in the following injection molding steps, so that a stronger combination between the resin and the aluminum alloy substrate may be formed.

In some embodiments of present disclosure, the corrosion solution may be an aqueous solution comprising ammonia and ammonia salt. In a further preferred embodiment, the corrosion solution may be an aqueous solution comprising $NH_3$—$NH_4Cl$, $NH_3$—$(NH_4)_2SO_4$, $NH_3$—$NH_4HCO_3$, and $NH_3$—$NH_4NO_3$. The aqueous solution allows the corrosion pore to be distributed on the outer surface of the oxide layer evenly. The diameters and the structure of the corrosion pores form a better bonding between the resin and the aluminum alloy substrate. Thus, the obtained aluminum alloy resin composite may possess better stretch resistances. In some embodiments of the present disclosure, the corrosion solution is stable, and may help to maintain a stable alkaline environment in a long period of time.

In some embodiments of the present disclosure, based on the total weight of the corrosion solution, the total of the ammonia and ammonia salt has a weight concentration percent of about 0.1% to about 30%. In some embodiments of the present disclosure, the corrosion solution comprises about 50 weight parts to about 99 weight parts of the ammonia. In some embodiments of the present disclosure, the corrosion solution comprises about 50 weight parts to about 90 weight parts of the ammonia. In some embodiments of the present disclosure, the corrosion solution comprises about 50 weight parts to about 80 weight parts of the ammonia.

In some embodiments of the present disclosure, the corrosion solution comprises about 1 weight part to about 50 weight parts of the ammonia salt. In some embodiments of the present disclosure, the corrosion solution comprises about 10 weight parts to about 50 weight parts of the ammonia salt. In some embodiments of the present disclosure, the corrosion solution comprises about 20 weight parts to about 50 weight parts of the ammonia salt.

In an embodiment, the corrosion solution comprises about 50 weight parts to about 99 weight parts of the ammonia, and about 1 weight part to about 50 weight parts of the ammonia salt. In an embodiment, the corrosion solution comprises about 50 weight parts to about 90 weight parts of the ammonia, and about 10 weight parts to about 50 weight parts of the ammonia salt. In an embodiment, the corrosion solution comprises about 50 weight parts to about 80 weight parts of the ammonia, and about 20 weight parts to about 50 weight parts of the ammonia salt.

In some embodiments of the present disclosure, the corrosion pore is formed by immersing the aluminum alloy substrate with the nanopore in the corrosion solution for one or more times. The immersing time for each time is about 1 minute to about 60 minutes. Optionally, the aluminum alloy substrate may be washed with deionized water after each immersing. In an embodiment, the aluminum alloy substrate may be washed in a washing tank for about 1 minute to about 5 minutes. Alternatively, the aluminum alloy substrate is placed in a washing tank for about 1 min to about 5 min. In an embodiment, the corrosion pore may be formed by immersing the aluminum alloy with the nanopore in the corrosion solution for 2 to 10 times.

In an embodiment of the present disclosure, the method of preparing the aluminum alloy resin composite may further comprise: S3) placing the aluminum alloy substrate obtained from step S2) in a mold, injecting a resin composition into the mold to be combined with the aluminum alloy substrate, and molding so as to form the aluminum alloy resin composite.

In some embodiments of the present disclosure, the method further comprises a pretreatment step prior to the anodic oxidation. In some embodiments, the pretreatment may comprise at least one step selected from a group of burnishing, removing oil, first water-washing, alkali etching, second water-washing, neutralizing, and third water-washing.

Specifically, the pretreament generally comprises mechanical burnishing or mechanical lapping to remove visible foreign matters from the surface, and degreasing and washing the aluminum alloy to remove processing oil adhered to the metal surface. Alternatively, the pretreatment may comprise burnishing the surface of an aluminum alloy substrate using, for example, a sand paper of about 100 mesh to about 400 mesh or using a polishing machine, to create small pores of microns. In some embodiments of the present disclosure, the burnished aluminum alloy substrate may be sequentially subjected to removing oil, first water-washing such as washing with water, alkali etching, second water-washing, neutralizing, and third water-washing.

In some embodiments of the present disclosure, the aluminum alloy may be cleaned by means of ultrasonic wave using any known solvent for about 0.5 hour to about 2 hours to remove oily dirty from the surface of aluminum alloy. And then the aluminum alloy substrate may be placed in an acid/alkali aqueous solution, and the surface of the aluminum alloy substrate may be washed again under ultrasonic wave. The types of the solvents and acid/alkali aqueous solution are not limited. The solvent used may be ethanol or acetone. The acid/alkali aqueous solution may be at least one selected from a group of hydrochloric acid, sulphuric acid, sodium hydroxide, potassium hydroxide and the like.

In an embodiment, the aluminum alloy is subjected to oil removing treatment using water-free ethanol to remove oil from the surface. And then the aluminum alloy is washed using water and wiped. The aluminum alloy is immersed in a sodium hydroxide solution having a concentration of about 30 g/L to about 70 g/L and at a temperature of about 40 degrees Celsius to about 80 degrees Celsius to alkali etch the aluminum alloy for about 1 minute to about 5 minutes. The aluminum alloy is then washed using deionized water. Then, the aluminum alloy is neutralized using a $HNO_3$ having a concentration of about 10 wt % to about 30 wt % to remove remaining alkali solution, and washed using deionized water. Thus, one or more pore having an average diameter of several microns may be formed on the surface of the aluminum alloy. In some embodiments of the present disclosure, the average diameter of the pore may be about 1 micron to about 10 microns.

There are no limits to the aluminum alloy used in present disclosure. For examples, the aluminum alloy may be Industry-Standard 1000-7000 series or various aluminum alloys suitable for molding. The aluminum alloy according to embodiments of the present disclosure may be commonly used aluminum alloy with various shapes and structures, which is not limited by the present disclosure. The various shapes and structures of the aluminum alloy may be achieved by mechanical processing.

There is no limitation to the resin used in the present invention. The resin may be any resin capable of combining with the aluminum alloy. In an embodiment, the resin composition comprises a thermoplastic resin. In an embodiment, the thermoplastic resin may comprise a main resin and a polyolefin resin.

In some embodiments of the present disclosure, the main resin may comprise non-crystalline resin, which has a surface gloss and a toughness both superior to those of the highly crystalline resin in the prior art, used as an injection molding material. A polyolefin resin with a melting point of about 65 degree Celsius to about 105 degree Celsius may also be used. Therefore, injection molding may not be required to perform at a specific mold temperature during the molding step, so the molding process may be simplified. And it may be ensured that the obtained metal-resin composite (for example, the aluminum alloy-resin composite) may have high mechanical strength and good surface treatment characteristics, thus allowing a wide range of applications for surface decoration of plastic articles and meeting the diverse requirements of customers.

Because the polyolefin resin has a melting point of about 65 degree Celsius to about 105 degree Celsius in the non-crystalline main resin, the resin may flow into the nanopores on the surface of the metal (for example, the aluminum alloy or the aluminum alloy substrate) more easily, forming a strong bonding between the metal and the plastic (for example, the resin or the resin composition) and providing high mechanical strength.

In some embodiments of the present disclosure, based on 100 weight parts of the thermoplastic resin, the thermoplastic resin comprises about 70 weight parts to about 95 weight parts of the main resin, and about 5 weight parts to about 30 weight parts of the polyolefin resin.

In some embodiments of the present disclosure, the thermoplastic resin may further comprise a flow modifier. The flow modifier improves the flowing capability and the injection molding performance of the thermoplastic resin, thereby improving the adhesion between the metal and the resin. In an embodiment, based on 100 weight parts of the thermoplastic resin, the thermoplastic resin comprises about 1 weight part to about 5 weight parts of a flow modifier, and the flow modifier is a cyclic polyester.

In some embodiments of the present disclosure, the main resin may comprise a polyphenylene oxide (PPO) and a polyphenylene sulfide (PPS). In some embodiments, the main resin is a mixture of the PPO and the PPS. In an embodiment, the weight ratio of the PPO to the PPS is about 3:1 to about 1:3. In an embodiment, the weight ratio of the PPO to the PPS is about 2:1 to about 1:1.

In some embodiments of the present disclosure, the main resin may comprise a polyphenylene oxide (PPO) and a polyamide (PA). In an embodiment, the weight ratio of the PPO to the PA is about 3:1 to about 1:3. In an embodiment, the weight ratio of the PPO to the PA is about 2:1 to about 1:1.

In some embodiments of the present disclosure, the main resin may comprise a polycarbonate (PC). The main resin may be a linear PC and/or a branched PC, without special limits in the present disclosure.

In some embodiments of the present disclosure, the polyolefin resin may have a melting point of about 65 degrees Celsius to about 105 degrees Celsius. In some embodiments, the polyolefin resin is a grafted polyethylene. In an embodiment, the polyolefin resin is a grafted polyethylene having a melting point of about 100 degrees Celsius to about 105 degrees Celsius.

In some embodiments of the present disclosure, the resin composition may further comprise other additives according to the requirements, without special limits in the present disclosure. In some embodiments, the resin composition may further comprise a filler. The filler may be known to those skilled in the art, such as, a fiber filler or a powder filler. In some embodiments, the fiber filler may be at least one selected from a group of fiberglass, carbon fiber and polyamide fiber such as aromatic polyamide fiber. In some embodiments, the powder filler may be at least one selected from a group of silica, talc, aluminum hydroxide, magnesium hydroxide, calcium carbonate, magnesium carbonate, glass, kaolin, heavy barium sulfate, and clay.

In some embodiments of the present disclosure, based on 100 weight parts of the main resin, the resin composition may comprise about 50 weight parts to about 150 weight parts of the fiber filler, and about 50 weight parts to about 150 weight parts of the powder filler. Thus, the resin composition may have a coefficient of linear expansion similar to that of the aluminum alloy substrate both in horizontal and vertical directions.

In some embodiments of the present disclosure, the resin composition used in the present disclosure may be prepared by mixing the main resin and the polyolefin resin. The resin composition may be prepared by any mechanical mixing method known in that art. For example, the resin composition is prepared by mixing evenly a main resin and a polyolefin resin, and then granulated with a twin-screw extruding machine.

In some embodiments of the present disclosure, the flow modifier and the filler may be added to the main resin and mixed evenly. Thus, the obtained resin composition may have a linear expansion coefficient similar to the aluminum alloy substrate both in horizontal and vertical directions.

The conditions to carry out the injection molding are not limited. In some embodiments, the condition of the injection molding may be: a mold temperature of about 50 degrees Celsius to about 200 degrees Celsius, a nozzle temperature of about 100 degrees Celsius to about 350 degrees Celsius, an injection pressure of about 50 MPa to about 140 MPa, a pressure maintaining time of about 1 second to about 10 seconds, an injection time of about 1 second to about 30 seconds, and a delay time of about 1 second to about 30 seconds. In some embodiments, the weight of the injected resin composition may be about 1 g to about 2000 g, and a resin layer of the prepared aluminum alloy resin composite may have a thickness of about 0.5 mm to about 10 mm.

The embodiments of the present disclosure simplify the production process compared with existing adhesive technologies and shorten the corrosion time. The hot pressing stage in the prior methods, which use a double stage injection molding-hot pressing-injection molding, may be omitted. Moreover, the aluminum alloy resin composite prepared according to embodiments of the present disclosure has a better adhesion between the resin and the aluminum alloy and better tensile shear strength.

According to another aspect of the present disclosure, there is provided an aluminum alloy resin composite obtained by the method described above. The aluminum alloy resin composite may comprise: an aluminum alloy substrate and a resin layer comprising a resin composition. At least a part of the resin composition is filled in the nanopores and the corrosion pores.

The present disclosure will be further described below in details with reference to examples thereof. It would be appreciated that particular examples described herein are merely used to understand the present disclosure. The examples shall not be construed to limit the present disclosure. The raw materials used in the examples and the comparative examples are all commercially available, without special limits.

Example 1

In this example, an aluminum alloy resin composite was prepared with the following steps:

1) Pretreatment

A commercially available 5052 aluminum alloy plate with a thickness of 1 mm was cut into 15 mm×80 mm rectangular sheets, which were then polished in a polishing machine, and cleaned with water-free ethanol, and then immersed in a 40 g/L NaOH aqueous solution. After 2 minutes, the rectangular sheets were washed with deionized water to form a pretreated aluminum alloy sheets.

2) Surface Treatment 1

Each aluminum alloy sheet (used as an anode) was placed in an anodizing bath including a 20 wt % $H_2SO_4$ solution, and electrolyzed under a voltage of 20 V at 20 degrees Celsius for 10 min, and then the aluminum alloy sheet was blow-dried.

3) Surface Treatment 2

500 ml aqueous solution (pH=10.2) including 75 g $NH_3$ and 27 g $NH_4Cl$ was prepared in a beaker. The aluminum alloy sheet obtained from step 2) was immersed in the aqueous solution at 20 degrees Celsius for 5 minutes, then taken out, placed in a beaker including water, and immersed for 1 minute. The process was repeated for 5 times. After water immersing for the last time, the resulting aluminum alloy sheet was blow-dried.

Figure 2:
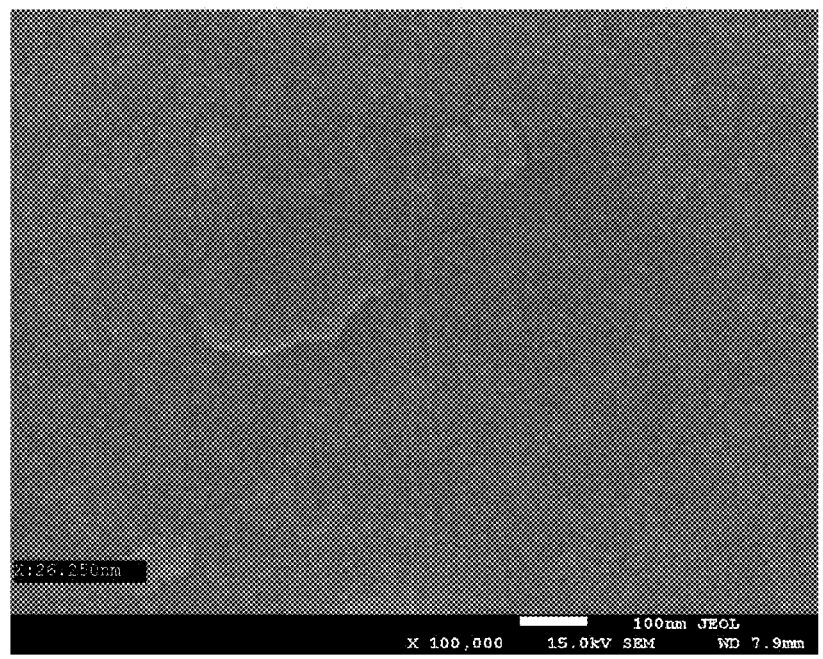
FIG. 2 is a scanning electron microscopy diagram of a surface of an aluminum alloy sheet subjected to a surface treatment 1 according to Example 1 of the present disclosure.

The cross section of the aluminum alloy sheet subjected to surface treatment 1 was observed by an electron microscope. And it was shown that the aluminum oxide layer formed by the anodizing has a thickness of 5 microns. The surface of the aluminum alloy sheet subjected to surface treatment 1 was observed by an electron microscope (as shown in FIG. 2). And it was shown that the aluminum oxide layer was formed with nanopores, and the nanopore had an average diameter of about 40 nm to about 60 nm, and a depth of about 4.5 microns.

Figure 3A:
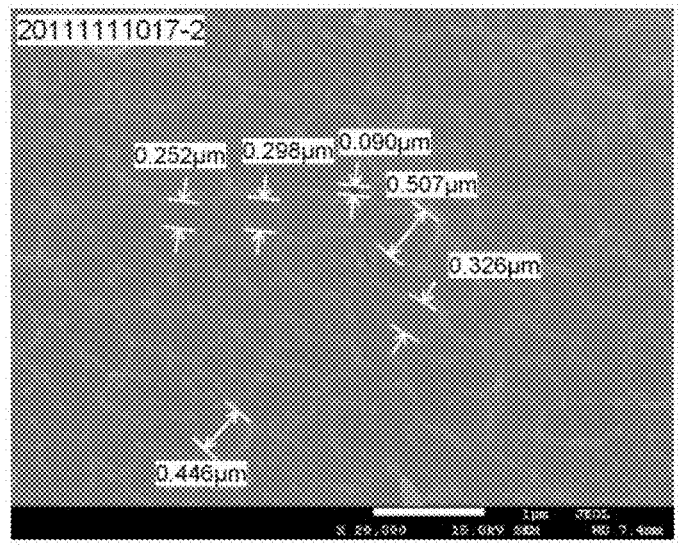
FIGS. 3a and 3b are scanning electron microscopy diagrams of the surface of the aluminum alloy sheet subjected to a surface treatment 2 according to Example 1 of the present disclosure.
Figure 3B:
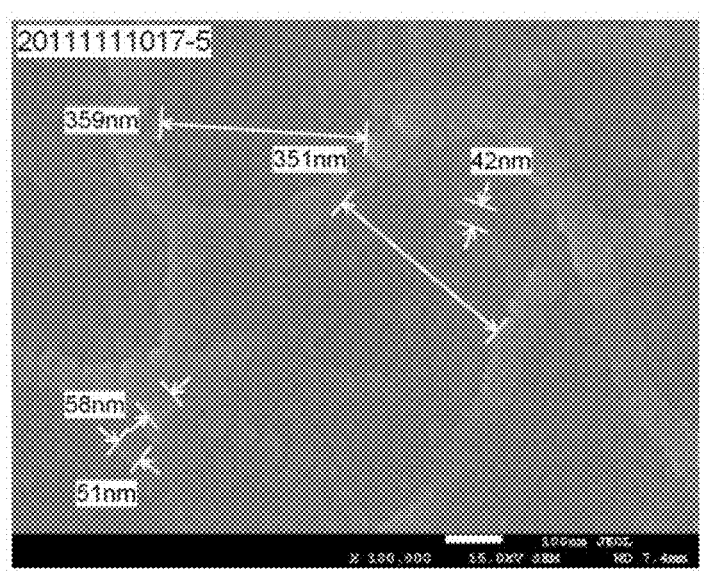

The surface of the aluminum alloy sheet subjected to surface treatment 2 was observed by an electron microscope (as shown in FIGS. 3a and 3b). And it was shown that the surface of the aluminum alloy sheet was formed with corrosion pores, and the corrosion pore had an average diameter of about 200 nm to about 800 nm, and a depth of about 0.5 micron. It was also shown that the nanopores and corrosion pores form a two-layer spatial pore structure as shown in FIG. 1 in the aluminum oxide layer, and the nanopores were communicated with the corrosion pores.

4) Molding

The dried aluminum alloy sheet was inserted into an injection mold, and injection molded with a resin composition including a polyphenylene sulfide (PPS) resin and a fiberglass (based on the total weight of the resin composition, the content of the fiberglass was 30 wt %). A firm bonding between the aluminum alloy and the resin composition was obtained in the aluminum alloy-resin composite after the removal of the mold and cooling.

Example 2

In this example, an aluminum alloy resin composite was prepared by a method that is substantially the same as the method in Example 1, with the following exceptions.

In the step of surface treatment 2, a 500 ml aqueous solution (pH=11.1) including 144 g $NH_3$ and 27 g $NH_4Cl$ was prepared in a beaker. The aluminum alloy sheet obtained from step 2) was immersed in the aqueous solution at 20 degrees Celsius for 5 minutes, taken out and placed in a beaker including water, and immersed for 1 minute. After repeating the process for 5 times, the resulting aluminum alloy sheet was blow-dried.

Measured using the same method as disclosed in Example 1, it was shown that the aluminum oxide layer formed by the anodizing has a thickness of 5 microns. The aluminum oxide layer was formed with nanopores. And the nanopores had an average diameter of about 40 nm to about 60 nm, and a depth of about 4 microns. It was measured that the surface of the aluminum alloy sheet was formed with corrosion pores. The corrosion pores had an average diameter of about 300 nm to about 1000 nm, and a depth of about 1 micron. A two-layer spatial pore structure similar to the structure shown in FIG. 1 was formed in the aluminum oxide layer, in which the nanopores were communicated with the corrosion pores.

Example 3

In this example, an aluminum alloy resin composite was prepared by a method that is substantially the same as the method in Example 1, with the following exceptions.

In the step of surface treatment 2, a 500 ml aqueous solution (pH=11.4) including 150 g $NH_3$ and 57 g $NH_4Cl$ was prepared in a beaker. The aluminum alloy sheet obtained from step 2) was immersed in the aqueous solution at 20 degrees Celsius for 5 minutes, then taken out and placed in a beaker including water, and immersed for 1 minute. After repeating the process for 5 times, the resulting aluminum alloy sheet was blow-dried.

Measured with the same method as disclosed in Example 1, it was shown that the aluminum oxide layer formed by the anodizing had a thickness of 5 microns, the aluminum oxide layer was formed with nanopores, and the nanopores had an average diameter of about 40 nm to about 60 nm, and a depth of about 4 microns. It was observed that the surface of the aluminum alloy sheet was formed with corrosion pores. The corrosion pore had an average diameter of about 600 nm to about 1000 nm, and a depth of about 1 micron. A two-layer spatial pore structure similar to the structure shown in FIG. 1 was form in the aluminum oxide layer, in which the nanopores were communicated with the corrosion pores.

Example 4

In this example, an aluminum alloy resin composite was prepared by a method that is substantially the same as the method in Example 1, with the following exceptions.

In the step of surface treatment 2, a 500 ml aqueous solution (pH=12.0) including 200 g $NH_3$ and 100 g $NH_4Cl$ was prepared in a beaker. The aluminum alloy sheet obtained from step 2) was immersed in the aqueous solution at 20 degrees Celsius for 5 minutes, then taken out and placed in a beaker including water, and immersed for 1 minute. After repeating the process for 5 times, the resulting aluminum alloy sheet was blow-dried.

Measured using the same method as disclosed in Example 1, it was shown that the aluminum oxide layer formed by the anodizing had a thickness of 5 microns. The aluminum oxide layer was formed with nanopores, which had an average diameter of about 40 nm to about 60 nm, and a depth of about 2 microns. It was measured that the surface of the aluminum alloy sheet was formed with corrosion pores, which had an average diameter of about 800 nm to about 1200 nm, and a depth of about 3 microns. A two-layer spatial pore structure similar to the structure shown in FIG. 1 was formed in the aluminum oxide layer, and the nanopores were communicated with the corrosion pores.

Example 5

In this example, an aluminum alloy resin composite was prepared by a method that is substantially the same as the method in Example 1, with the following exceptions.

In the step of surface treatment 2, a 500 ml aqueous solution (pH=12.2) including 250 g $NH_3$ and 80 g $NH_4Cl$ was prepared in a beaker. The aluminum alloy sheet obtained from step 2) was immersed in the aqueous solution at 20 degrees Celsius for 5 minutes, then taken out and placed in a beaker including water, and immersed for 1 minute. After repeating the process for 5 times, the resulting aluminum alloy sheet was blow-dried.

Measured using the same method as disclosed in Example 1, it was shown that the aluminum oxide layer formed by the anodizing had a thickness of 5 microns. The aluminum oxide layer was formed with nanopores, which had an average diameter of about 40 nm to about 60 nm, and a depth of about 1 micron. It was measured that the surface of the aluminum alloy sheet was formed with corrosion pores, which had an average diameter of about 1000 nm to about 1500 nm, and a depth of about 4 microns. A two-layer spatial pore structure similar to the structure shown in FIG. 1 was formed in the aluminum oxide layer, in which the nanopores were communicated with the corrosion pores.

Example 6

In this example, an aluminum alloy resin composite was prepared by a method that is substantially the same as the method in Example 1, with the following exceptions.

In the step of surface treatment 2, a 500 ml aqueous solution (pH=12.5) including 298 g $NH_3$ and 85 g $NH_4Cl$ was prepared in a beaker. The aluminum alloy sheet obtained from step 2) was immersed in the aqueous solution at 20 degrees Celsius for 5 minutes, then taken out and placed in a beaker including water, and immersed for 1 minute. After the process was repeated for 5 times, the resulting aluminum alloy sheet was blow-dried.

Measured using the same method as disclosed in Example 1, it was shown that the aluminum oxide layer formed by the anodizing has a thickness of 5 microns. The aluminum oxide layer was formed with nanopores, which had an average diameter of about 40 nm to about 60 nm, and a depth of about 1 micron. It was measured that the surface of the aluminum alloy sheet was formed with corrosion pores, which had an average diameter of about 1000 nm to about 1500 nm, and a depth of about 4 microns. A two-layer spatial pore structure similar to the structure shown in FIG. 1 was formed in the aluminum oxide layer, in which the nanopores were communicated with the corrosion pores.

Example 7

In this example, an aluminum alloy resin composite was prepared by a method that is substantially the same as the method in Example 1, with the following exceptions.

In the step of surface treatment 2, a 500 ml aqueous solution (pH=12.3) of ethylene diamine having a weight percent of 10 wt % was prepared in a beaker. The aluminum alloy sheet obtained from step 2) was immersed in the aqueous solution at 20 degrees Celsius for 5 minutes, then taken out and placed in a beaker including water, and immersed for 1 minute. After the process was repeated for 5 times, the resulting aluminum alloy sheet was blow-dried.

Measured using the same method as disclosed in Example 1, it was shown that the aluminum oxide layer formed by the anodizing has a thickness of 5 microns. The aluminum oxide layer was formed with nanopores, which had an average diameter of about 40 nm to about 60 nm, and a depth of about 1 micron. It was measured that the surface of the aluminum alloy sheet was formed with corrosion pores, which had an average diameter of about 1000 nm to about 1800 nm, and a depth of about 4 microns. A two-layer spatial pore structure similar to the structure shown in FIG. 1 was formed in the aluminum oxide layer, in which the nanopores were communicated with the corrosion pores.

Comparative Example 1

1) Pretreatment

A commercially available 5052 aluminum alloy plate with a thickness of 1 mm was cut into 15 mm×80 mm rectangular sheets, which were then polished in a polishing machine, cleaned with water-free ethanol, and then immersed in a 2 wt % NaOH aqueous solution. After 2 minutes, the rectangular sheets were washed with water to form pretreated aluminum alloy sheets.

2) Surface Treatment

Each of the pretreated aluminum alloy sheet was immersed into a hydrazine hydrate aqueous solution having a concentration of 5 wt % (pH=11.2). After 2 minutes at 50 degrees Celsius, the aluminum alloy sheet was taken out and washed with deionized water. After the process was repeated for 30 times, the resulting aluminum alloy sheet was taken out and dried in a drying oven at 60 degrees Celsius.

3) Molding

The dried aluminum alloy sheet was inserted into an injection mold, and injection molded with a resin composition including a polyphenylene sulfide (PPS) resin and a fiberglass (based on the total weight of the resin composition, the content of the fiberglass was 30 wt %). A bonding between the aluminum alloy and the resin composition was obtained after the removal of the mold and cooling.

Comparative Example 2

1) Pretreatment

A commercially available 5052 aluminum alloy plate with a thickness of 1 mm was cut into 15 mm×80 mm rectangular sheets, which were then polished in a polishing machine, and cleaned with water-free ethanol, and then immersed in a 2 wt % NaOH aqueous solution. After 2 minutes, the rectangular sheets were washed with water to form pretreated aluminum alloy sheets.

2) Surface Treatment

Each of the pretreated aluminum alloy sheet (used as an anode) was placed in an anodizing bath including a 20 wt % $H_2SO_4$ solution, was electrolyzed under a voltage of 15V for 10 minutes, and then was blow-dried.

3) Molding

The dried aluminum alloy sheet was inserted into an injection mold, and injection molded with a resin composition including a polyphenylene sulfide (PPS) resin and a fiberglass (based on the total weight of the resin composition, the content of the fiberglass was 30 wt %). A bonding between the aluminum alloy and the resin composition was obtained after the removal of the mold and cooling.

Tests

The aluminum alloy resin composites prepared in Examples 1-7 and Comparative Examples 1-2 are fixed in a universal material testing machine to perform tensile test. The test results under maximum load can be regarded as the bonding force value between the aluminum alloy and resin. The test results are summarized in Table 1.

TABLE 1

|  | Depth of nanopore/ mircon | Average diameter of nanopore/nm | Depth of corrosion pore/ micron | Average diameter of corrosion pore/nm | Combination force/N |
|---|---|---|---|---|---|
| Example 1 | 4.5 | 40-60 | 0.5 | 200-800 | 1181 |
| Example 2 | 4 | 40-60 | 1 | 300-1000 | 1235 |
| Example 3 | 4 | 40-60 | 1 | 600-1000 | 1239 |
| Example 4 | 2 | 40-60 | 3 | 800-1200 | 1246 |
| Example 5 | 1 | 40-60 | 4 | 1000-1500 | 1258 |
| Example 6 | 1 | 40-60 | 4 | 1000-1500 | 1222 |
| Example 7 | 1 | 40-60 | 4 | 1000-1800 | 1263 |
| Comparative Example 1 |  | 20-100 |  | / | 357 |
| Comparative Example 2 |  | 40-60 |  | / | 65 |

Referring to Table 1, the bonding between the resin and the aluminum alloy in the aluminum alloy-resin composite of the present disclosure can achieve up to 1263 N, which is a significantly improvement over conventional aluminum alloy-resin composites.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A method of preparing an aluminum alloy resin composite, comprising:
   providing an aluminum alloy substrate having an oxide layer formed by anodic oxidation on a surface thereof, wherein the oxide layer has nanopores;
   forming corrosion pores on an outer surface of the oxide layer by using a corrosion agent, wherein the corrosion agent is at least one selected from a group of ammonia, ammonium salt, hydrazine, hydrazine derivative, and water-soluble amine compound, wherein the corrosion pores have a larger diameter than the nanopores, the corrosion pores and the nanopores form a double-layer pore structure, and the corrosion pores are in communication with the nanopores; and
   injection molding a resin composition to the surface of the aluminum alloy substrate through the nanopores and the corrosion pores, wherein the resin composition is fixedly attached to the aluminum alloy substrate.

2. The method according to claim 1, wherein the corrosion pores are formed by immersing the aluminum alloy substrate with the nanopores into a corrosion solution comprising the corrosion agent, and the corrosion solution has a pH of about 10 to about 13.

3. The method according to claim 2, wherein the corrosion solution is an aqueous solution comprising at least one selected from a group of ammonia, ammonium salt, ethylene diamine, diethyl amine, ethanolamine, trimethyl amine, methyl amine, and dimethyl amine.

4. The method according to claim 3, wherein the corrosion solution is an aqueous solution comprising ammonia and ammonia salt.

5. The method according to claim 4, wherein the corrosion solution is an aqueous solution comprising $NH_3$—$NH_4Cl$, $NH_3$—$(NH_4)_2SO_4$, $NH_3$—$NH_4HCO_3$, and $NH_3$—$NH_4NO_3$.

6. The method according to claim 4, wherein based on the total weight of the corrosion solution, the concentration of the ammonia and ammonia salt is about 0.1% to about 30% by weight percent.

7. The method according to claim 6, wherein the corrosion solution comprises about 50 weight parts to about 99 weight parts of the ammonia, and about 1 weight part to about 50 weight parts of the ammonia salt.

8. The method according to claim 7, wherein the corrosion solution comprises about 50 weight parts to about 90 weight parts of the ammonia, and about 10 weight parts to about 50 weight parts of the ammonia salt.

9. The method according to claim 7, wherein the corrosion solution comprises about 50 weight parts to about 80 weight parts of the ammonia, and about 20 weight parts to about 50 weight parts of the ammonia salt.

10. The method according to claim 2, wherein the corrosion pores are formed by immersing the aluminum alloy substrate with the nanopores in the corrosion solution for one or more times, and the immersing time for each immersing is about 1 minute to about 60 minutes.

11. The method according to claim 1, wherein the nanopores have an average diameter of about 10 nm to about 100 nm, the corrosion pores have an average diameter of about 200 nm to about 2000 nm, and the oxide layer has a thickness of about 1 micron to about 5 microns.

12. The method according to claim 1, wherein the anodic oxidation is carried out under the condition of: the aluminum alloy substrate is electrolyzed in a sulphuric acid having a concentration of about 10 wt % to about 30 wt % at a temperature of about 10 degrees Celsius to about 30 degrees Celsius under a voltage of about 10 V to about 100 V for about 1 min to about 40 min to form the oxide layer having a thickness of about 1 micron to about 10 microns on a surface of the aluminum alloy.

13. The method according to claim 12, further comprising pretreating the aluminum alloy prior to the anodic oxidation, wherein the pretreatment comprises at least one step selected from a group of burnishing, removing oil, first water-washing, alkali etching, second water-washing, neutralizing, and third water-washing.

14. The method according to claim 1, wherein the resin composition comprises a thermoplastic resin.

15. The method according to claim 14, wherein the thermoplastic resin comprises a main resin and a polyolefin resin.

16. The method according to claim 15, wherein the main resin comprises a polyphenylene oxide and a polyphenylene sulfide, the polyolefin resin has a melting point of about 65 degrees Celsius to about 105 degrees Celsius, and the weight ratio of the polyphenylene oxide to the polyphenylene sulfide is about 3:1 to about 1:3.

17. The method according to claim 15, wherein the main resin comprises a polyphenylene oxide and a polyamide, the polyolefin resin has a melting point of about 65 degrees Celsius to about 105 degrees Celsius, and the weight ratio of the polyphenylene oxide to the polyamide in the main resin is about 3:1 to about 1:3.

18. The method according to claim 14, wherein the resin composition further comprises a filler comprising a fiber filler and a powder filler, wherein the fiber filler is at least one selected from a group of fiberglass, carbon fiber and polyamide fiber, and the powder filler is at least one selected from a group of silica, talc, aluminum hydroxide, magnesium hydroxide, calcium carbonate, magnesium carbonate, glass, kaolin, heavy barium sulfate, and clay.

* * * * *